United States Patent
Gretz

(10) Patent No.: US 6,709,280 B1
(45) Date of Patent: Mar. 23, 2004

(54) FITTING WITH IMPROVED CONTINUITY

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 10/053,076

(22) Filed: Jan. 17, 2002

(51) Int. Cl.$^7$ ................................................ H01R 4/66
(52) U.S. Cl. ........................ 439/92; 174/65 R; 174/939
(58) Field of Search .......................... 174/65 R, 51, 174/153 G; 439/92, 95, 96, 108, 557, 939

(56) References Cited

U.S. PATENT DOCUMENTS

| | | | | |
|---|---|---|---|---|
| 1,483,218 A | * | 2/1924 | Fahnestock ............... | 174/65 R |
| 3,814,467 A | * | 6/1974 | van Buren, Jr. ............... | 285/92 |
| 4,032,178 A | * | 6/1977 | Neuroth ....................... | 285/162 |
| 4,198,537 A | * | 4/1980 | Mariani ..................... | 174/65 R |
| 4,361,302 A | * | 11/1982 | Lass ............................. | 248/56 |
| 4,549,755 A | * | 10/1985 | Kot et al. .................... | 285/341 |
| 4,657,212 A | * | 4/1987 | Gilmore et al. ............... | 248/56 |
| 4,773,280 A | * | 9/1988 | Baumgarten ................ | 403/197 |
| 4,880,387 A | * | 11/1989 | Stikeleather et al. .......... | 439/98 |
| 5,373,106 A | * | 12/1994 | O'Neil et al. ............. | 174/65 R |
| 5,496,195 A | * | 3/1996 | Reed ......................... | 439/607 |
| 5,934,940 A | * | 8/1999 | Maranto et al. ............ | 439/607 |
| 5,971,811 A | * | 10/1999 | Mori et al. ................. | 439/675 |
| 5,975,957 A | * | 11/1999 | Noda et al. .................. | 439/609 |
| 6,050,854 A | * | 4/2000 | Fang et al. .................. | 439/607 |
| 6,099,350 A | * | 8/2000 | Wright ........................ | 439/582 |
| 6,210,217 B1 | * | 4/2001 | Ping ........................... | 439/557 |

\* cited by examiner

*Primary Examiner*—Tho D. Ta
*Assistant Examiner*—Larisa Tsukerman

(57) ABSTRACT

A fitting for connecting a cable to an electrically conducting electrical junction box that improves the continuity between the fitting, the cable, and the junction box. The fitting features a hollow electrical connector having an electrical conducting spring member surrounding its leading end with the spring member including at least one grounding tang and at least one spring locking member cantilevered from its outer circumference. The locking member extends at a slope away from the leading end such that when the fitting is pressed into a hole in a junction box, the locking member is compressed by the surrounding wall of the junction box toward the fitting and as the locking member clears the surrounding wall, it snaps outward to its relaxed state and thereby locks the fitting into the box. The grounding tang, located near the trailing end of the spring member, extends at a rising slope from its supported end to a crest and then at a downward slope to its trailing end. When pressed into a hole in a junction box, the grounding tangs are compressed toward the fitting until the crest clears the hole whereupon the springiness of the grounding tangs and the downward slope cause the fitting to be drawn tightly against the junction box wall.

5 Claims, 5 Drawing Sheets

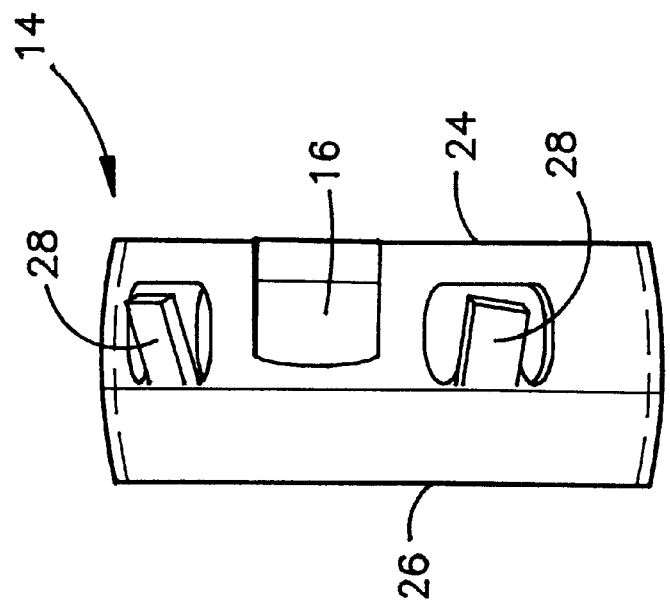
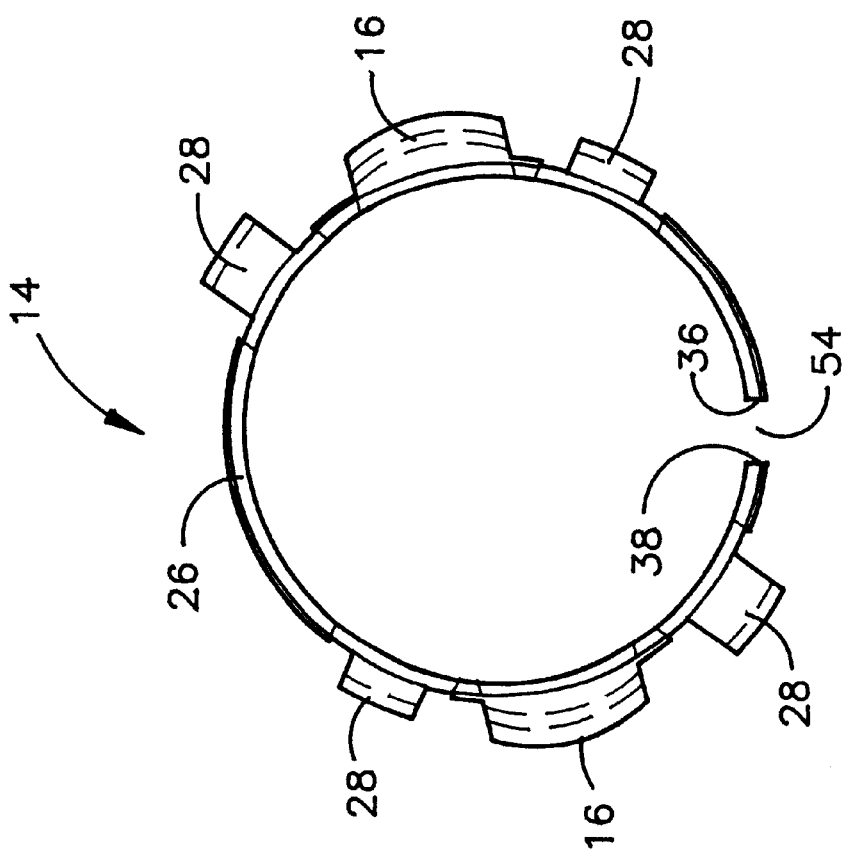
FIG. 6
FIG. 5

FITTING WITH IMPROVED CONTINUITY

FIELD OF THE INVENTION

This invention relates to fittings for electrically conducting electrical junction boxes and specifically to an improved fitting that provides improved electrical continuity between the fitting, the cable, and the junction box.

BACKGROUND OF THE INVENTION

Historically, the most common form of attaching cable and electrical metal tubing (EMT) to electrical junction boxes was by means of an interior-threaded lock nut, which is screwed onto the exterior-threaded electrical fitting that extends into the junction box.

Recently, snap fitting connectors have become popular as a means of connecting cables to electrical junction boxes. One such type of snap fitting is disclosed in U.S. Pat. No. 5,373,106 (hereinafter the '106 patent) issued Dec. 13, 1994, and entitled "Snap In Cable Connector". This patent disclosed a quick connect fitting for an electrical junction box including a spring steel spring member that improved the ease of use and reduced the time involved in securing electrical connectors to electrical junction boxes. This application also disclosed the use of outward-bent tensioner tangs to provide electrical continuity or ground between the electrical connector, the junction box, and the source leading to the box as an integral part of the design of the connector.

Although the '106 patent provided an improved quick connect fitting, the present invention further improves the functionality of the quick connect fitting by providing a tensioner or grounding tang of a novel design that holds the quick connect fitting more tightly to the junction box and therefore vastly improves the electrical continuity and lowers the millivolt droop between the fitting, the cable, and the junction box. These and other advantages will become apparent by reading the attached specification and claims in conjunction with reference to the attached drawings.

SUMMARY OF THE INVENTION

The present invention comprises a fitting that exhibits improved electrical continuity between the fitting, the cable, and the junction box. The fitting features a hollow electrical connector having an electrical conducting spring member surrounding its leading end with the member including one or more grounding tangs and spring locking members cantilevered from its outer circumference. When the fitting is pushed into a hole in a junction box, the locking members are first compressed by the surrounding wall of the junction box and after clearing the wall snap outwards to lock the fitting into the box. The grounding tangs, located near the trailing end of the spring member, extend at a rising slope from their supported end to a crest and then at a downward slope back towards the fitting such that when the fitting is pressed into a hole in a junction box, the grounding tangs are compressed by the surrounding wall of the junction box toward the fitting until the crest clears the surrounding wall whereupon the springiness of the grounding tangs and the downward slope cause the fitting to be drawn tightly against the junction box wall and therefore vastly improve electrical continuity between the fitting, cable, and box.

DESCRIPTION OF THE DRAWINGS

FIG. 5 is a plan view of the preferred embodiment of the spring member as viewed from the leading end.

FIG. 6 is a side view of the preferred embodiment of the spring member with the leading end on the left of the figure and the trailing end on the right.

Index to Reference Numerals in Drawings

| | |
|---|---|
| 10 | fitting |
| 12 | hollow electrical connector |
| 14 | electrical conducting spring member |
| 16 | grounding tangs |
| 18 | leading end (of connector) |
| 20 | trailing end (of connector) |
| 22 | central bore |
| 24 | trailing edge (of spring member) |
| 26 | leading edge (of spring member) |
| 28 | spring locking member |
| 30 | U-shaped slots |
| 32 | slits |
| 34 | side (of grounding tang) |
| 36 | first end (of spring member) |
| 38 | second end (of spring member) |
| 40 | hole (for mandrel) |
| 42 | supported end (of grounding tang) |
| 44 | trailing end (of grounding tang) |
| 46 | middle (of spring member) |
| 48 | rising slope (of grounding tang) |
| 50 | crest (of grounding tang) |
| 52 | downward slope (of grounding tang) |
| 54 | gap |
| 56 | flange |
| 58 | shoulder |
| 60 | smooth intermediate portion |
| 62 | face |
| 64 | hole (in junction box) |
| 66 | junction box wall |
| 68 | inner edge (of surrounding wall) |

DETAILED DESCRIPTION OF THE INVENTION

The present invention comprises a fitting that provides improved electrical continuity between the fitting itself, an inserted cable, and an electrically conducting electrical junction box. This invention relates to and incorporates herein by reference in its entirety pending U.S. application Ser. No. 10/034,156 filed Dec. 26, 2001 and titled "Threaded Snap In Connector".

Figure 8:
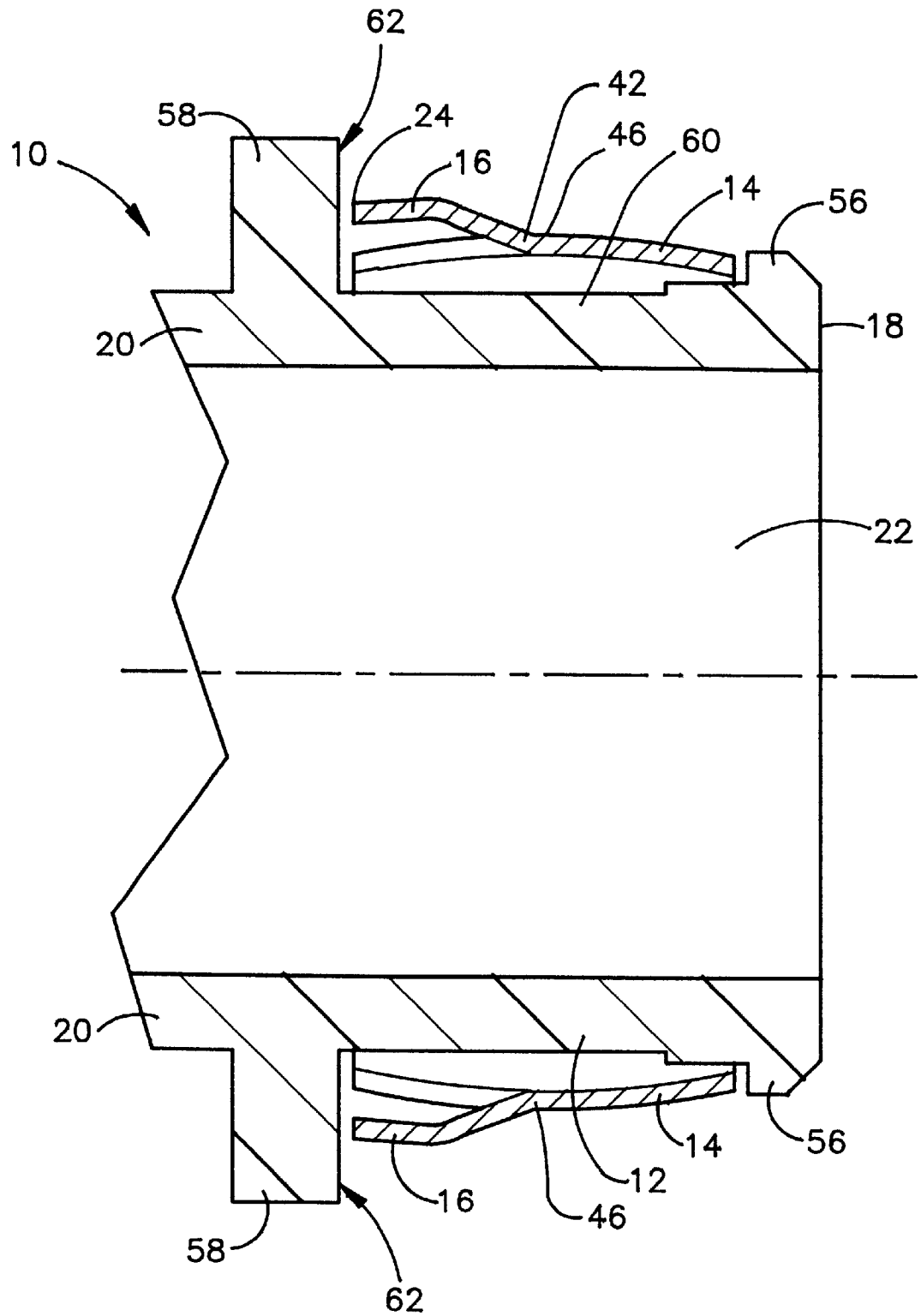
FIG. 8 is a side sectional view of the preferred embodiment of the fitting including the preferred embodiment of the spring member seated on the leading end of the connector.

Referring to FIG. 8, a sectional view of the fitting with improved continuity is depicted by reference numeral 10 and includes a hollow electrical connector 12, a cylindrical electrical conducting spring member 14, and at least two integral outward-bent grounding tangs 16 supported at one end from the spring member 14. The electrical connector 12 has a leading end 18 which will be inserted into a junction box (not shown) and a trailing end 20, a portion of which is cutaway in FIG. 8. A central bore 22 extends through the connector 12.

Figure 1:
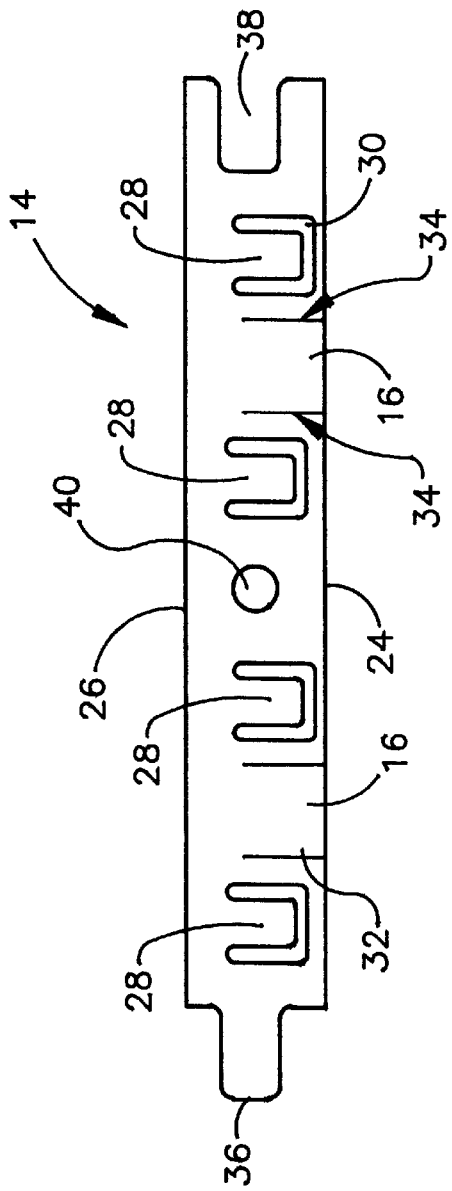
FIG. 1 is a laid out view of the preferred embodiment of the electrical conducting spring member of the present invention.

FIG. 1 illustrates a laid out view of the preferred embodiment of the spring member 14 of the present invention after it has been stamped out of a flat piece of metal. The spring member 14 includes a trailing edge 24 and a leading edge 26 and one or more integral spring locking members 28. FIG. 1 depicts a preferred embodiment of the spring member 14 with four spring locking members 28 spaced at roughly even intervals across the spring member 14. U-shaped slots 30 preferably surround each of the spring locking members 28. Slits 32 stamped along the trailing edge 24 of the spring member 14 form the sides 34 of two integral outward-bent grounding tangs 16. The spring member includes a first end 36 that is shaped into a tab that will fit within a slot in the second end 38. The hole 40 depicted in the center of the spring member 14 is used only for locking the spring member 14 into a mandrel (not shown) to bend it into its cylindrical shape and is not material to the invention.

Figure 2:
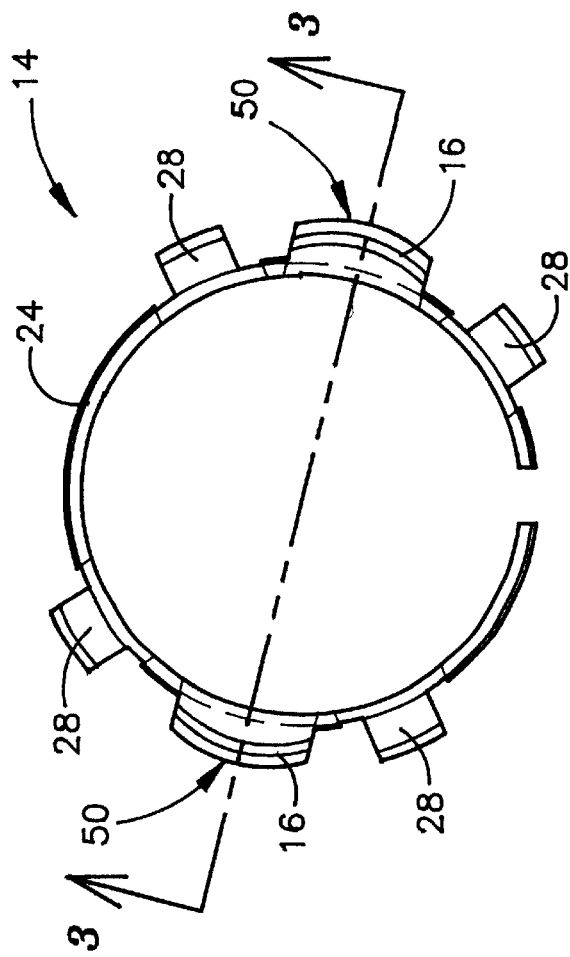
FIG. 2 is a plan view of the preferred embodiment of the spring member as viewed from the trailing end.

Referring to FIG. 2, a plan view is shown of the preferred embodiment of the electrical conducting spring member 14 after it has been formed into the cylindrical shape required for use in the invention. FIG. 2 shows the spring member 14 as viewed from the trailing edge 24. As shown in the figure, both grounding tangs 16 and the four spring locking members 28 are all bent outwards of the cylindrical ring portion.

Figure 3:
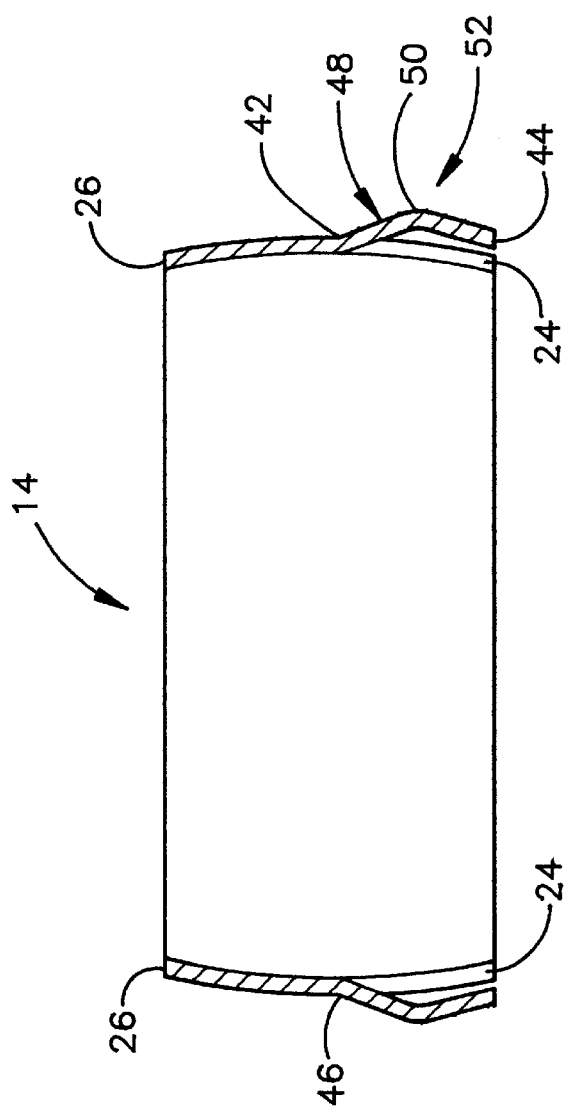
FIG. 3 is a sectional view of the spring member taken along line 3–3 of FIG. 2.

FIG. 3 depicts a sectional view of the spring member 14 taken along line 3—3 of FIG. 2. In this view, the grounding tangs 16 are visible along the trailing edge 24 where they are bent outwards of the cylindrical periphery of the spring member 14. The grounding tangs 16 are integral with and supported at one end from the spring member 14 and therefore have a supported end 42 and an unsupported or trailing end 44. The cylindrical-shaped spring member 14 is preferably wider in diameter at its middle 46 than at the trailing edge 24 or leading edge 26. Following the outer periphery of the spring member 14 from the leading edge 26 to the trailing edge 24 shown in FIG. 3, the grounding tang 16 is first bent outwards from its supported end 42 with a rising slope 48 to a crest 50 and then with a downward slope 52 to its trailing end 44.

Figure 4:
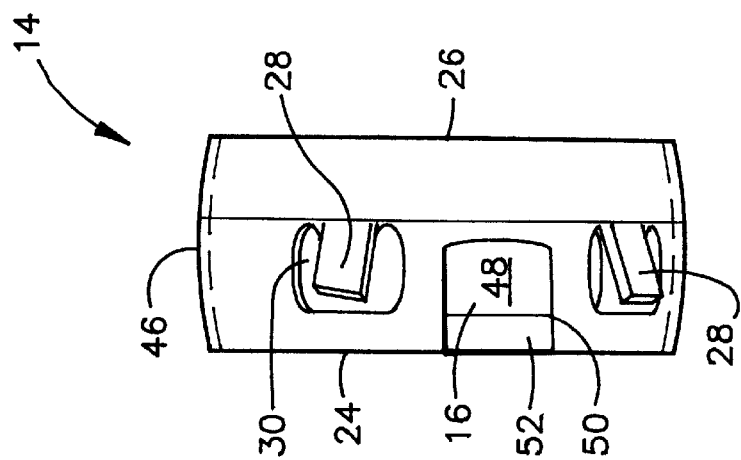
FIG. 4 is a side view of the spring member of FIG. 1.

Referring to FIG. 4, a side view is shown of the preferred embodiment of the spring member 14. The leading edge 26 of the spring member 14 is on the right side of the figure with the trailing edge 24 on the left of the figure. As depicted, the cylindrical spring member 14 is typically wider in diameter in the middle 46 than at the leading 26 or trailing 24 edges. Two of the spring locking members 28 and one of the grounding tangs 16 are visible in the side view of FIG. 4. U-shaped slots 30 are visible around each spring locking member 28. The grounding tang 16 includes a rising slope section 48, a crest 50, and a downward slope section 52.

FIG. 5 is a plan view of the preferred embodiment of the spring member 14 as viewed from the leading edge 26. Two grounding tangs 16 are visible spaced roughly 180° apart on the outer periphery of the cylindrical spring member 14. Four spring locking members 28 are visible and spaced roughly 90° apart on the outer periphery of the cylindrical spring member 14. A small gap 54 exists as shown between the first 36 and second 38 end of the spring member 14 after the spring spring member 14 is formed into its cylindrical shape.

Referring to FIG. 8 again, a side sectional view is shown of the preferred embodiment of the fitting 10 with the preferred embodiment of the electrical conducting spring member 14 fitted on the leading end 18 of the hollow electrical connector 12. The connector 12 includes a flange 56 on its leading end 18, a shoulder 58 on its trailing end, and a smooth intermediate portion 60 therebetween to provide a seat for the spring member 14. When formed into its cylindrical shape, the spring member 14 is initially formed into a cylindrical shape with a diameter less than the outer diameter around the smooth intermediate portion 60. When the spring member 14 is pushed over the leading end 18 of the connector 12, it therefore snaps and holds tightly around the intermediate portion 60 of the leading end 18 of the connector 12. A face 62 is formed on the leading side of the shoulder 58.

Figure 7:
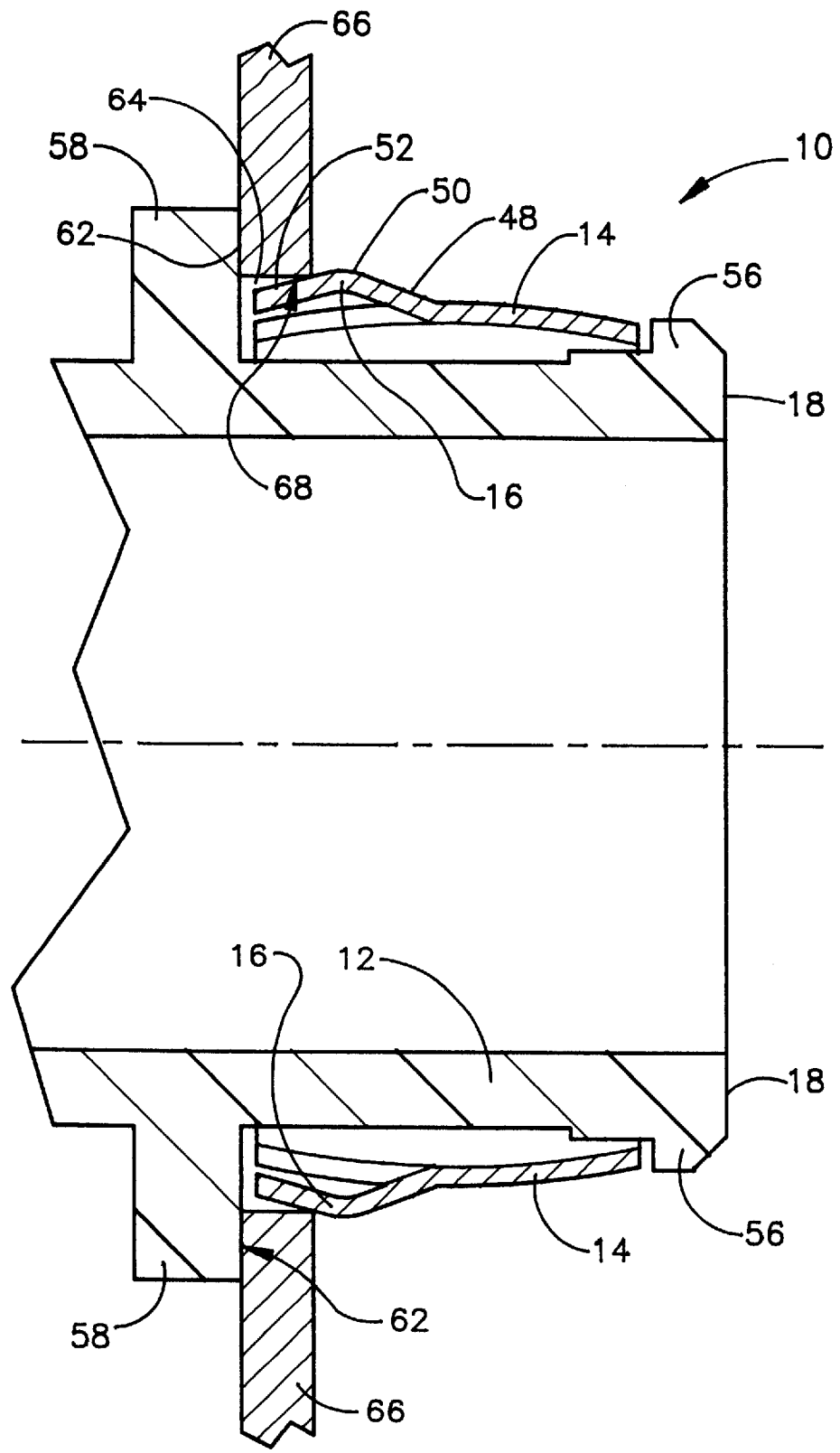
FIG. 7 is a side sectional view of the preferred embodiment of the fitting fully inserted into a hole in a junction box.

The operation of the present invention may be explained by referring first to FIG. 8. The electrical conducting spring member 14, being constructed of spring steel or equivalent material and being of smaller diameter than the flange 56 at the leading end 18 of the hollow electrical connector 12, is pushed over the leading end 18 of the connector 12 until it snaps onto the intermediate portion 60. The electrical connector 12 with the spring member 14 snapped thereto form the fitting of the present invention. As shown in FIG. 8, the spring member 14 resides on the intermediate portion 60 of the connector 12. The outer diameter of the grounding tangs 16 extend beyond the outer diameter of the middle 46 portion of the spring member 14 and to a greater diameter than the diameter of a hole (not shown) in a junction box that it will be used in conjunction with. The spring member 14 includes a leading edge 26 that fits against the flange 56 on the leading end 18 of the connector 12 and a trailing edge 24 that fits against the face 62 of the shoulder 58 toward the trailing end 20 of the connector 12. Referring to FIG. 7, the fitting 10 may then be pushed, leading end 18 first, into a hole 64 in an electrically conductive electrical junction box, the walls 66 of which are shown in FIG. 7. As the leading end 18 enters the hole 64, the surrounding walls 66 first contact the rising slope 48 on the supported ends 42 of the grounding tangs 16 forcing the grounding tangs 16 to compress inward. Continued advancement of the fitting 10 into the hole 64 of the junction box causes the crest 50 of the grounding tangs 16 to slip within the surrounding walls 66 and therefore creates the greatest compression of the grounding tangs 16. Further advancement of the fitting 10 then causes the downward slope 52 of the grounding tangs 16 to contact the inner edge 68 of the surrounding wall whereupon the downward slope 52 and the tendency of the grounding tangs 16 to spring outwards to their unbiased or relaxed position causes the face 62 of the fitting 10 to be drawn tightly against the wall 66 of the junction box. The downward slope 52 of the grounding tangs 16 and the outward force exerted by the grounding tangs 16 trying to return to their unbiased or relaxed state hold the fitting 10 tightly against the face 62 of the shoulder 58 thereby creating good electrical continuity and low millivolt drop between the fitting 10 and the junction box (wall portion shown).

The snap tight fitting 10 of the present invention can be designed for various typical trade sizes of access holes that may be encountered in junction boxes. For example, a ½" trade size spring member 14 is designed to fit a 0.875" diameter standard hole in a junction box. For the 0.875" diameter hole, the spring member 14 preferably measures 0.945" in diameter measured across the cylindrical spring member 14 from the crest 50 of one grounding tang 16 to the crest 50 of the grounding tang 16 180° across from it, such as would be measured across line 3—3 of FIG. 2. The preferred diameter measured across the spring locking members 28, located 180° apart, as shown in FIG. 2, is typically 1.025" for the ½" trade size spring member 14. The width of the ½" trade size spring member 14, as measured from the trailing edge 24 to the leading edge 26 shown in FIG. 1, is preferably 0.375". Referring to FIG. 7, the wall thickness of a typical junction box is typically 0.060" and the length of the downward slope 52 portion of the grounding tang 16 between the crest 50 and the trailing edge 24 is typically 0.090", therefore once the crest 50 has cleared the hole 64 the downward slope 52 portion will tend to pull the fitting 10 tight against the face 62 of the connector 12.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A fitting for an electrically conducting electrical junction box comprising:

a hollow electrically conductive connector through which an electrical conductor is inserted with said connector having a leading end thereof for insertion in a hole in an electrical junction box and a face for limiting the depth of insertion of said connector in said hole;

an electrically conductive spring member surrounding said leading end of said electrical connector which has a leading portion and trailing portion;

a spring locking member integral with and cantilevered at one end from said spring member, said spring locking member springs inward to permit said spring member and said locking member to be inserted in said hole in said junction box and springs outward to lock said electrical connector from being withdrawn from said hole; and a grounding tang integral with and supported at one end from said spring member and free at its trailing end with said grounding tang having a rising slope at said supported end, a downward slope at said trailing end and a crest separating said rising slope and said downward slope allowing said grounding tang to spring inward as said leading portion is inserted in said hole in said junction box and further allowing said grounding tang to spring outward after said crest clears said hole of said junction box thereby enabling said grounding tang to draw said face of said electrical connector against said junction box and provide electrical continuity between said junction box and said electrical connector.

2. The fitting of claim 1 wherein said spring member is less than a complete circle and includes a relaxed diameter, said hole includes a diameter, and said relaxed diameter of said spring member is less than said diameter of said hole thereby enabling said spring locking member and said crest of said grounding tang to extend beyond said diameter of said hole.

3. The fitting of claim 1 wherein said spring member is a split ring with the two ends of the ring shaped to overlap one another.

4. The fitting of claim 1 wherein said connector includes a flange and shoulder with a smooth intermediate portion therebetween with said spring member carried on said intermediate portion and held in position by said flange and said shoulder.

5. A method for quickly connecting fittings to electrical junction boxes comprising:

providing an electrically conductive electrical junction box with a hole, said hole having a diameter;

providing an electrically conductive electrical connector having a leading end for insertion in said hole and a face limiting the distance said connector is inserted in said hole;

providing a circular electrically conductive spring member surrounding said leading end of said electrical connector with said spring member having a leading portion and a trailing portion;

providing at least one spring locking member on said spring member that has a relaxed outer dimension greater than said diameter of said hole;

providing at least one grounding tang integral with and supported at one end from said spring member and free at its opposite end, said grounding tang having a rising slope at said supported end, a downward slope at said trailing end and a crest separating said rising slope and said downward slope; and inserting said leading end of said electrical connector with said surrounding spring member into said hole until said crest of said grounding tang clears said hole and said grounding tang draws said face of said electrical connector against said junction box thereby providing electrical continuity between said junction box and said electrical connector.

* * * * *